Nov. 10, 1942.  L. KANG  2,301,213

SPRAYING APPARATUS

Filed Sept. 20, 1940

INVENTOR
LAWRENCE KANG
BY Edgar H. Kent
ATTORNEY

Patented Nov. 10, 1942

2,301,213

UNITED STATES PATENT OFFICE 2,301,213

SPRAYING APPARATUS

Lawrence Kang, Wahiawa, Territory of Hawaii, assignor to Hawaiian Pineapple Company, Limited, Honolulu, Territory of Hawaii, a corporation of the Territory of Hawaii Application September 20, 1940, Serial No. 357,635

8 Claims. (Cl. 299—29)

This invention relates to apparatus for spraying plants with insecticides, fungicides, plant foods or stimulants and the like. More particularly, the invention relates to such apparatus adapted for the spraying of pineapple plants and the like which are planted in regular, more or less parallel spaced rows or beds.

In pineapple culture, as in the case of many other types of crops, a satisfactory yield is dependent to a large degree on proper spraying of the plants at appropriate stages in their growth with such solutions as insecticides, fungicides or plant foods. Where the acreage under cultivation is extensive, it is the practice to accomplish the spraying with the aid of spray carts or trucks adapted to pass through the fields of plants and equipped with spraying apparatus including tanks, pumps and pipes or hoses provided with nozzles through which the spray solution is discharged under pressure. In this manner a large number of rows of plants may be sprayed in one passage of the spray tank through the field.

Usually, in order to assure proper application of the spray to each individual plant of a row, the nozzle or group of nozzles for supplying spray to the row is under manual control, the operator walking beside the truck and directing the spray outlets under his control at the desired point of each plant in one row. In some cases, to save time and labor, the spray truck has been provided with a framework projecting laterally across the rows to which the spray nozzles are fixed at intervals corresponding to row spacing.

Obviously, manual guidance of the spray outlets requires a large amount of labor and also necessitates slow operation of the spray truck. On the other hand, if the nozzles are fixed at row spacing intervals to the supporting framework, the spraying is not accurate or uniform, due to the impossibility of maintaining the truck and nozzle supporting framework in uniform position relative to the rows as the truck advances over the uneven ground and due to the fact that individual plants of a row do not grow in uniform alignment nor to a uniform height.

It is an object of the present invention to provide novel means for discharging an insecticide, stimulant or the like from a moving source, such as a tank truck, onto the plants of a row and for automatically directing the spray uniformly onto each plant or a predetermined portion thereof regardless of ground unevenness, irregularities in plant height, disalignment of plants and the tilting and swaying of the truck as it advances along the row. A further object of the invention is to provide such means which is inexpensive and simple to construct and a plurality of which may be employed for efficiently spraying simultaneously a large number of plant rows without individual manual guidance, thereby effecting considerable savings in time, labor and cost of spraying. Other objects and advantages of the invention will be apparent from the ensuing more particular description and from the accompanying drawing, wherein:

Figure 1:
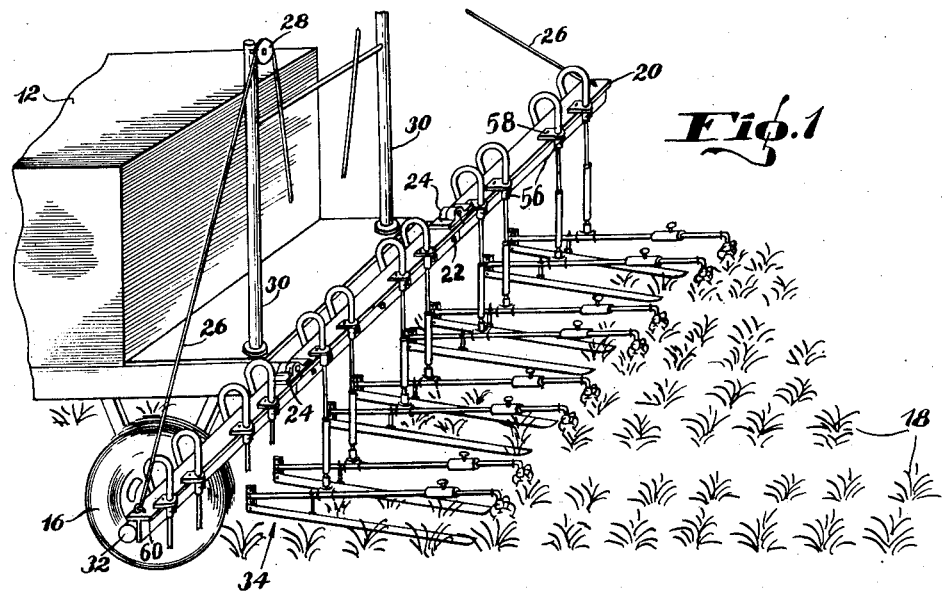
Fig. 1 is a perspective view of part of a spraying truck embodying the present invention, with parts broken away.
Figure 2:
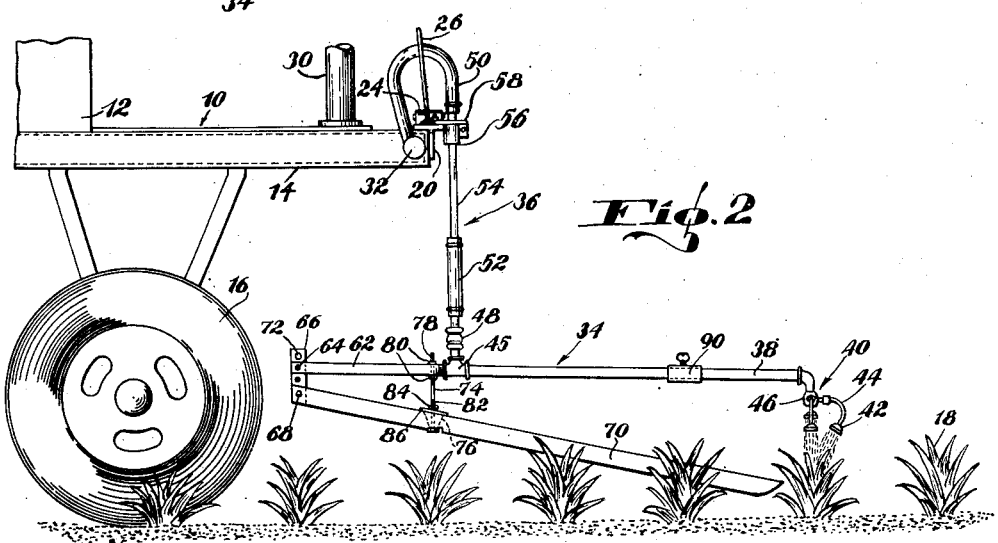
Fig. 2 is a side elevation of the truck portion and of one of the spray distributing devices shown in Fig. 1, with parts broken away.
Figure 3:
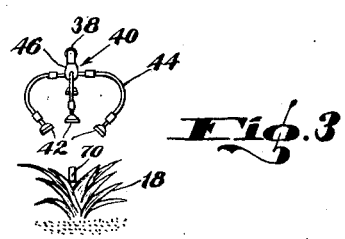
Fig. 3 is a rear end view of one of the spray distributing devices shown in Figs. 1 and 2, illustrating the guiding action of the runner.

In Figs. 1 and 2 of the accompanying drawing, the novel spraying means of the invention is shown applied to a spray truck 10 provided with a spray tank 12, the truck having a frame 14 supported from ground wheels 16 at sufficient height for plant clearance, the wheels 16 being properly spaced to run in the spaces between rows or beds of plants 18 when the truck is driven through the field by a suitable motor and driving connections (not shown). While the particular plants shown in the drawing are pineapple plants, it will be understood that the invention, although particularly adapted to the spraying of pineapple plants, may be used advantageously in the spraying of numerous other types of plants of a similar nature.

Secured to the frame 14 to project laterally beyond the sides of the truck is a rigid frame extension or boom 20 which may, as shown, comprise an angle iron bolted as at 22 to the rear end of the frame 14. Preferably, the projecting ends of the boom 20 are formed separate from the central portion and are connected thereto by hinges 24, said hinges adapted to permit raising of said end portions from the horizontal position shown in Fig. 1 to a substantially vertical position when not in use for spraying purposes. For supporting the projecting ends of the boom in raised or lowered position, there may be provided cables 26 connected at one end to the outer ends of the boom, passing over bearings 28 on an elevated frame 30 on the truck 10, and secured in any convenient fashion to the truck, as by means of a manual or power operated winch (not shown).

On the boom 20 is mounted a spray pipe 32 closed at its outer ends and connected centrally, through a suitable power operated pump or pumps (not shown), with the spray tank 12. When, as in Fig. 1, the boom is made of sections hinged together, the pipe 32 may be made either of flexible hose or of sections of rigid pipe connected by flexible couplings below the hinges 24. To the pipe 32 are connected, at appropriate intervals, the dispensing devices of the invention, indicated generally by the reference numeral 34, there being one such device for each row of plants over which the boom 20 extends.

Referring now more particularly to Figs. 1 and 2, it will be seen that each dispensing device 34 includes a vertically disposed conduit 36 communicating at one end with the pipe 32 and depending from the boom 20 and a horizontally disposed rigid conduit 38 connected to the conduit 36 and terminating in a dispenser head 40, in this instance a cluster of nozzles 42 connected by pipes 44 to a filter chamber 46. Conduit 38 is connected at one end to the conduit 36 by means of an elbow 45 and a liquid tight swivel joint 48 so that conduit 38 and dispenser head 40 are free to pivot in a horizontal plane about the lower end of the conduit 36.

Preferably, as shown, conduit 36 is made of three sections connected together to form a continuous duct, these being two short lengths of flexible hose 50 and 52 connected, respectively, to the pipe 32 and to the swivel joint 48, and an intermediate length of rigid pipe 54 connecting the hose 50 to the hose 52. Section 54 of the conduit 36 is releasably fastened in a clamping sleeve 56 having a bracket arm 58 bolted to a flange 60 extending longitudinally of the boom 20. A plurality of closely spaced apertures may be provided in the flange 60 so that the brackets 58 of clamp 56 may be secured in different positions longitudinally of the boom 20, while the clamping sleeve 56 permits adjustment of the length of the conduit 36 that depends below the boom, hose 50, due to its flexibility, automatically accommodating itself to these shifts in the horizontal and vertical position of the pipe 54. The flexibility of hose 52 permits the conduit 38 to move vertically relative to rigid fixed pipe 54 under the action of the nozzle guiding means now to be described.

Fixedly connected to the opposite side of elbow 45 from conduit 38 is a bar 62 extending outwardly from the elbow in substantial axial alignment with the conduit 38. Secured to the outer end of the bar 62, as by bolt 64, is a vertically extending bracket arm 66 to the lower end of which is fastened, as by bolt 68, a guiding runner 70 extending back below, in the plane of, the bar 62 and conduit 38 to adjacent the dispenser head 40. Bracket arm 66 is preferably provided longitudinally with a plurality of apertures 72 each adapted to receive the bolts 64 or 68 so that the distance between the connected ends of the rod 62 and runner 70 may be varied as desired.

Runner 70 is rigidly but adjustably connected to the bar 62 by means of a tie bolt 74 extending upwardly through a slot 76 in the runner 70 and received through an aperture in the bar 62 adjacent the elbow 45. Bolt 74 is screw threaded at 78 to receive nuts 80 for attaching the bolt to bar 62 and also at 82 to receive nut 84 by which the bolt is secured to the runner 70. By adjustment of the nuts 80 and/or the nut 84 the runner 70 may be raised or lowered relative to the bar 62, the connections of bracket arm 66 to bar 62 and arm 70 being loose or loosened to permit such adjustment. Slot 76 is, as shown, flared outwardly toward the upper surface of runner 70 to permit variation in the angularity of the runner relative to the bolt 74 and the top of the slot is covered by a washer 86 on which the nut 84 is seated.

Runner 70 is of lightweight material such as wood, metal tubing or the like. It is preferably positioned to extend downwardly at a considerable angle relative to bar 62 and conduit 38 with its free end located below and just in advance of the spray dispensing head 40. Preferably also the weight of the runner 70, bar 62 and connecting parts is slightly less than the conduit 38 and the parts which it carries so that the frame formed by these parts is slightly unbalanced about its point of suspension from the hose 52, and, due to the flexibility of hose 52, normally hangs with the spray dispenser head end slightly below the opposite end.

In use, the dispensing devices 34 are set in the positions indicated in Figs. 1 and 2, that is, with each runner 70 and connected rod 62 and conduit 38 disposed transverse to the boom 20 approximately in the vertical plane of a row center, the bracket arm 66 being forward of and the dispenser head 40 to the rear of the swivel joint 48, and with the rearward end of each runner 70 resting between the upright leaf growth at the sides of the plants of a row, its under surface close to or lightly touching the top center or heart of the plants, as may be accomplished by proper adjustment of brackets 58 on rail 60, pipes 54 in clamping sleeves 56 and nuts 80 and 84 on tie bolts 74. The truck 10 is then driven through the field in substantially parallel relation with the rows and the pumps are operated to force the spraying medium continuously from the nozzles 42.

As the truck advances, the runner 70 is held centered over the plants by the upstanding leaf growth at the sides of a plant which forms, in effect, a trough in which the runner rides. Consequently, each dispenser head 40 is kept centered over the plants of the row by the guiding action of its runner despite disalignment of individual plants in a row and deviations of the truck from a path of movement parallel to the rows, in such cases the runner 70 causing the conduit 38 to swivel about the joint 48 to compensate for the momentary shifting of the plant center relative to the vertical axis of pipe 54. Likewise, each dispenser head 40 is maintained at a substantially uniform height above the center of the plants in its row despite differences in height of individual plants of the row and ground unevenness which causes the boom 20 to shift position vertically relative to the top center of adjacent plants in the row. In such cases, the runner 70 rises or falls to the center of the plant as the case may be, correspondingly raising or lowering the head 40, this movement being permitted by the flexibility of the hose 52. A small adjustable counterweight 90 on the conduit 38 adjacent the dispenser head 40 tends to prevent bobbing of conduit 38 under the reactive force of the spray.

For the sake of simplicity and economy, I prefer to so form the necessary conduit connections between the spray head and the spray tank that they can be utilized for supporting the spray head in manner suited for control by the guiding runner, as in the embodiment shown in the drawing and just described. However, it will be evident that this is not essential and that the spray dispensing head can, if desired, be supported from the boom by a frame separate from the conduit, in such case the frame being suitably articulated for response to the guiding action of the runner, as in the case of the frame formed from conduit sections above described, and the conduit connecting the spray dispenser head to the spray source being entirely flexible or having such flexibility as may be necessary to accommodate itself to the varying movements of the dispenser head.

It will be apparent that these and various other changes in construction details of the preferred embodiment illustrated herein may be made without departing from the spirit and scope of the invention, as set forth in the appended claims.

I claim:

1. In a mobile spraying machine, the combination of a frame, a spray distributing and directing unit comprising a spray dispensing head, a guide runner and means connecting said runner to said head, means suspending said unit from said frame in an operative position above the ground with at least a portion of said runner positioned to rest upon the plants of a row, said suspending means including parts constructed and arranged to provide for free substantially horizontal and vertical swinging movements of said unit relative to the frame, said runner being sufficiently narrow to enter within the trough formed by the side leaves of the plants of a row, said unit being sufficiently light in weight to permit the side leaves of the plants of a said row, engaging said runner, to swing said unit horizontally and vertically relative to the frame thereby to maintain said runner substantially centered in said trough as the machine is moved along said row, said spray dispensing head being so constructed that when the guide runner rides in said trough the spray is directed toward the plants of said row.

2. In a mobile spraying machine, the combination of a frame, a supporting arm, means suspending said arm from said frame, said means including parts constructed and arranged to provide for substantially vertical and horizontal swinging of said arm relative to the frame, a spray dispensing head mounted on said arm, and guide runner means so operatively connected to said arm and head and so positioned as to ride in the trough formed by the side leaves of a row of plants as the machine is moved therealong to control the horizontal and vertical swinging movements of said arm and head, said spray dispensing head being so constructed that when the guide runner means rides in said trough the spray is directed toward said plants.

3. In a mobile spraying machine, the combination of a frame, a supporting arm, means suspending said arm from said frame and connected to said arm intermediate its ends, said suspending means including parts constructed and arranged to provide for vertical rocking of said arm and horizontal swinging of said arm relative to said frame, a spray distributing head mounted on the arm at one side of said suspending means, a guiding runner connected to the arm on the other side of said suspending means and extending under said means to adjacent the vertical plane of said head, the portion of said runner adjacent the plane of said head being positioned to ride upon the plants of a row, within the trough formed by their side leaves, as the machine is moved therealong, said spray dispensing head being so constructed that when the guide runner rides in said trough the spray is directed toward the plants of said row.

4. In a mobile spraying machine, the combination of a frame, a supporting arm, means suspending said arm from said frame, said means including parts constructed and arranged to provide for vertical rocking of said arm and horizontal swinging of said arm relative to said frame, a spray distributing head mounted on said arm at one side of said suspending means, a guiding runner connected to said arm and having a portion thereof below and adjacent said head positioned and constructed to ride upon the plants of a row, within the trough formed by their side leaves, as the machine is moved therealong to control the rocking and swinging of said arm, the structure suspended by said suspending means comprising parts at opposite sides of said means so constructed and arranged that said structure on one side of said means substantially balances the structure on the other side of said means, said spray dispensing head being so constructed that when the guide runner rides in said trough the spray is directed toward the plants of said row.

5. In a mobile spraying machine, the combination of a frame, a conduit depending from said frame, a spray dispensing head, a feed pipe, forming a supporting arm for said head, communicating with said head and conduit and supported by said conduit, said conduit including liquid conducting portions constructed and arranged to provide for vertical rocking and horizontal swinging of said pipe and head relative to the frame, guide means so operatively connected to said head and feed pipe and so positioned as to ride in the trough formed by the side leaves of a row of plants as the machine is moved therealong to control the swinging and rocking movements of said head and pipe, said spray dispensing head being so constructed that when the guide means rides in said trough the spray is directed toward said plants, and means for connecting said conduit to a source of spraying medium under pressure.

6. In a mobile spraying machine, the combination of a frame, a conduit depending from said frame, a spray dispensing head, a feed pipe communicating with said head, a liquid conducting swivel joint connecting said pipe to said conduit and supporting said pipe and head for horizontal swinging movements about said conduit, guide means so operatively connected to said head and feed pipe and so positioned as to ride in the trough formed by the side leaves of a row of plants as the machine is moved therealong to control the said swinging movements of said head and pipe, said spray dispensing head being so constructed that when the guide means rides in said trough the spray is directed toward said plants, and means for connecting said conduit to a source of spraying medium under pressure.

7. In a mobile spraying machine, the combination of a frame, a conduit depending from said frame, a spray dispensing head, a feed pipe communicating with said head, a liquid conducting swivel joint connecting said pipe to said conduit and supporting said pipe and head for horizontal swinging movements about said conduit, said conduit including a flexible portion providing for vertical rocking of said head and feed pipe, guide means so operatively connected to said head and feed pipe and so positioned as to ride in the trough formed by the side leaves of a row of plants as the machine is moved therealong to control the swinging and rocking movements of said head and pipe, said spray dispensing head being so constructed that when the guide means rides in said trough the spray is directed toward said plants, and means for connecting said conduit to a source of spraying medium under pressure.

8. In a mobile spraying machine, the combination of a frame, a conduit depending from said frame, a spray dispensing head, a feed pipe, forming a supporting arm for said head, communicating with said head and conduit and supported by said conduit, said conduit including liquid conducting portions constructed and arranged to provide for vertical rocking and horizontal swinging of said pipe and head relative to the frame, guide means so operatively connected to said head and feed pipe and so positioned as to ride in the trough formed by the side leaves of a row of plants as the machine is moved therealong to control the swinging and rocking movements of said head and pipe, the structure supported by said conduit portions comprising parts at opposite sides of said conduit so constructed and arranged that said structure on one side of said conduit substantially balances said structure on the other side of said conduit, said spray dispensing head being so constructed that when the guide means rides in said trough the spray is directed toward said plants, and means for connecting said conduit to a source of spraying medium under pressure.

LAWRENCE KANG.